United States Patent
Jang et al.

(10) Patent No.: US 9,350,920 B2
(45) Date of Patent: May 24, 2016

(54) IMAGE GENERATING APPARATUS AND METHOD

(71) Applicant: Samsung Electronics Co., Ltd, Suwon-si, Gyeonggi-do (KR)

(72) Inventors: Jae-young Jang, Suwon-si (KR); Shuichi Shimokawa, Suwon-si (KR); Seung-sik Kim, Hwaseong-si (KR)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 9 days.

(21) Appl. No.: 14/281,937

(22) Filed: May 20, 2014

(65) Prior Publication Data

US 2014/0375861 A1    Dec. 25, 2014

(30) Foreign Application Priority Data

Jun. 21, 2013 (KR) .................. 10-2013-0071815

(51) Int. Cl.
*H04N 5/222* (2006.01)
*H04N 5/235* (2006.01)
*H04N 5/238* (2006.01)
*H04N 5/232* (2006.01)
*H04N 5/343* (2011.01)
*H04N 5/357* (2011.01)

(52) U.S. Cl.
CPC ......... *H04N 5/2353* (2013.01); *H04N 5/23232* (2013.01); *H04N 5/23293* (2013.01); *H04N 5/343* (2013.01); *H04N 5/357* (2013.01)

(58) Field of Classification Search
CPC . H04N 5/23267; H04N 5/235; H04N 5/2355; H04N 5/23219; H04N 5/2353; H04N 5/145; H04N 5/23229; G06T 2207/10016; G06T 2207/20201; G06T 5/003; G09G 2320/106
USPC ........... 348/220.1, 221.1, 330.1, 333.01, 362, 348/367
See application file for complete search history.

(56) References Cited

U.S. PATENT DOCUMENTS

| | | | |
|---|---|---|---|
| 2009/0040364 A1* | 2/2009 | Rubner | G06T 3/4053 348/362 |
| 2010/0231738 A1* | 9/2010 | Border | H04N 5/2353 348/222.1 |
| 2012/0307686 A1* | 12/2012 | Kung | H04L 12/14 370/259 |
| 2014/0027613 A1* | 1/2014 | Smith | H04N 5/2352 250/208.1 |

* cited by examiner

*Primary Examiner* — Trung Diep
(74) *Attorney, Agent, or Firm* — Staas & Halsey LLP

(57) ABSTRACT

An image generating method of an image generating apparatus is provided. The method includes displaying a live view image on a screen of an image generating apparatus, comparing a shutter speed with a frame rate of the live view image when there is a command to image a still image during the displaying of the live view image, adding current frame data of the live view image to next frame data of the live view image to generate added next frame data when the shutter speed is smaller than the frame rate of the live view image, and reading out the added next frame data of the live view image to generate the still image.

18 Claims, 15 Drawing Sheets

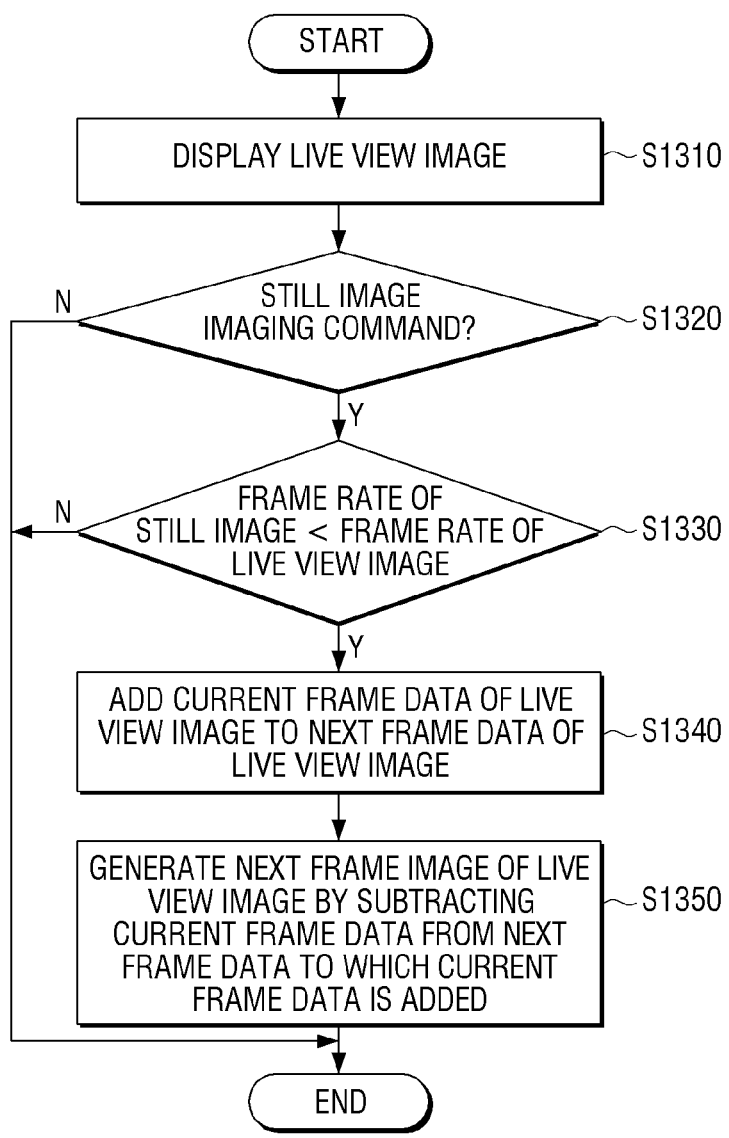

IMAGE GENERATING APPARATUS AND METHOD

CROSS-REFERENCE TO RELATED APPLICATIONS

This application claims priority under 35 U.S.C. §119 from Korean Patent Application No. 10-2013-0071815, filed on Jun. 21, 2013, in the Korean Intellectual Property Office, the disclosure of which is incorporated herein by reference in its entirety.

BACKGROUND OF THE INVENTION

1. Field of the Invention

Apparatuses and methods consistent with exemplary embodiments of the present general inventive concept relate to an image generating apparatus and method, and more particularly, to an image generating apparatus and method, capable of reducing noise when a still image is generated from a live view image.

2. Description of the Related Art

Most of digital cameras or smart phones developed in recent years provide an electrical view finder configured to let a user check a subject and a captured image with a naked eye. In capturing an image, the electrical view finder processes image information detected in an image sensor and displays a live view image. When the user operates a shutter, electronic apparatuses generate a still image corresponding to the live view image at a point of time when the shutter is operated.

Some electronic apparatuses provide a continuous shooting function configured to continuously capture a subject in preset time units and acquire pieces of still images. Since large amounts of data are required to perform the continuous shooting function, system performance of above a certain level is required to display a live view image while a series of still images output by the continuous shooting are processed.

As one method of solving the problem, technology to generate a still image by generating a live view image using only a portion of an image sensor, and combining the portion of the image sensor and the remainder of the image sensor in continuous shooting is suggested. FIG. 1 illustrates the above-described method.

That is, FIG. 1 is a schematic diagram illustrating technology to divide an image sensor to perform continuous shooting.

As illustrated in FIG. 1, the image sensor is configured of a plurality of pixels (total pixels 10). The total pixels 10 are divided into a first pixel group 11 configured to generate a live view image and a second pixel group 12 configured to generate a still image. The second pixel group 12 is configured of remaining pixels among total pixels 10 other than pixels constituting the first pixel group 11. For example, as illustrated in FIG. 1, the first pixel group 11 may include a red (R) pixel having coordinates (0,0), a green-red (Gr) pixel having coordinates (0,3), a green-blue (Gb) pixel having coordinates (3,0), and a blue (B) pixel having coordinates (3,3), and the second pixel group 12 may include the remaining pixels other than the pixels included in the first pixel group 11.

Live view image display is performed by processing data of the first pixel group 11. When there is a continuous shooting command, a still image having full resolution is generated by combining the first pixel group 11 and the second pixel group 12. When shutter speed, which may also be referred to as a frame rate of the still image, is smaller than a frame rate of a live view image, the above-described process is performed by adding an additional frame of the live view image, corresponding to the shutter speed. For example, when the shutter speed is ½ of the frame rate of the live view image, the second pixel group 12 of two pieces of continuous frames of the live view image is used to generate the still image.

The technology to independently generate the still image using only portions of pixel values of an image sensor while continuously providing the live view image promotes convenience of a user.

However, as described above, when the shutter speed is smaller than the frame rate of the live view image, since exposure data of the image sensor has to be read out plural times to generate one piece of still image, noise generated in the read-out process is increased. Therefore, there is a need for a method to reduce the read-out noise in the technology.

SUMMARY OF THE INVENTION

One or more exemplary embodiments of the present general inventive concept provide an image generating apparatus and method, which are capable of minimizing noise generated in a plurality of read-out processes for exposure data of an image sensor to generate a still image when a shutter speed is different from a frame rate of a live view image.

Additional features and utilities of the present general inventive concept will be set forth in part in the description which follows and, in part, will be obvious from the description, or may be learned by practice of the general inventive concept.

Exemplary embodiments of the present general inventive concept provide an image generating method. The method may include displaying a live view image on a screen of an image generating apparatus, comparing a shutter speed with a frame rate of the live view image when there is a command to image a still image during the displaying of the live view image, adding current frame data of the live view image to next frame data of the live view image to generate added next frame data when the shutter speed is smaller than the frame rate of the live view image, and reading out the added next frame data of the live view image to generate the still image.

The adding of the current frame data of the live view image to the next frame data of the live view image may include adding the current frame data of the live view image to the next frame data of the live view image without resetting the current frame data of the live view image.

The method may further include forming a potential of a direction of a photodiode by applying a bias voltage to current frame data of the live view image, and generating the next frame data to which the current frame data of the live view image is added through the photodiode.

The method may further include, when the command to image the still image is received during the displaying of the live view image, outputting first data from a first pixel group of an image sensor, and storing the first data. The frame data of the live view image may be based on data output from a second pixel group of the image sensor distinct from the first pixel group.

The generating of the still image may include generating a final still image by combining the stored first data and the read out added next frame data of the live view image.

The method may further include subtracting the current frame data of the live view image from the next frame data of the live view image, to which the current frame data of the live view image is added, to generate a next image frame of the live view image when the shutter speed is smaller than the frame rate of the live view image.

The method may further include displaying the generated next image frame of the live view image.

The method may further include generating the still image based on the current frame data of the live view image when the shutter speed is equal to or larger than the frame rate of the live view image.

Exemplary embodiments of the present general inventive concept also provide an image generating apparatus. The image generating apparatus may include a display configured to display a live view image, a frame rate comparator configured to compare a shutter speed with a frame rate of the live view image when there is a command to image a still image during displaying of the live view image, and a controller configured to add current frame data of the live view image to next frame data of the live view image when the shutter speed is smaller than the frame rate of the live view image, and to read out the next frame data of the live view image, to which the current frame data of the live view image is added, to generate the still image.

The controller may add the current frame data of the live view image to the next frame data of the live view image without resetting the current frame data of the live view image.

The controller may form a potential of a direction of a photodiode by applying a bias voltage to the current frame data of the live view image, and generate the next frame data to which the current frame data of the live view image is added through the photodiode.

The controller may output first data from a first pixel group of an image sensor and store the first data when the command to image the still image is received during the displaying of the live view image, and the frame data of the live view image may be based on data output from a second pixel group of the image sensor distinct from the first pixel group.

The controller may generate a final still image by combining the stored first data and the read out next frame data of the live view image.

The controller may subtract the current frame data of the live view image from the next frame data of the live view image, to which the current frame data of the live view image is added, to generate a next image frame of the live view image when the shutter speed is smaller than the frame rate of the live view image.

The controller may control the generated next image frame of the live view image to be displayed.

The controller may generate the still image based on the current frame data of the live view image when the shutter speed is equal to or larger than the frame rate of the live view image.

The image generating apparatus may be at least one among a smart phone, a cellular phone, a digital camera, an MPEG Audio Layer 3 (MP3), a portable multimedia player (PMP), a tablet personal computer (PC), a laptop computer, smart glasses, and a smart watch.

A non-transitory computer-readable recording medium may contain computer-readable codes as a program to execute the image generating method.

Exemplary embodiments of the present general inventive concept also provide an image generating method, the method including displaying a live view image, receiving an input to perform a shutter operation to image a still image during the displaying of the live view image, obtaining current frame data of the live view image at an image sensor, if a shutter speed is smaller than a frame rate of the live view image, obtaining next frame data of the live view image at the image sensor, the next frame data being combined with the current frame data in the image sensor to generate added next frame data in the image sensor, and reading out the added next frame data of the live view image from the image sensor to generate a still image.

Exemplary embodiments of the present general inventive concept also provide an image generating apparatus including a display configured to display a live view image, an image sensor to obtain frame data of the live view image, and a controller configured to receive an input to perform a shutter operation to image a still image during displaying of the live view image, to control the image sensor to add current frame data of the live view image to next frame data of the live view image to generate added next frame data of the live view image in the image sensor when the shutter speed is smaller than the frame rate of the live view image, and to read out the added next frame data of the live view image to generate a still image.

BRIEF DESCRIPTION OF THE DRAWINGS

These and/or other features and utilities of the present general inventive concept will become apparent and more readily appreciated from the following description of the embodiments, taken in conjunction with the accompanying drawings of which:

FIGS. 10 to 13 are flowcharts illustrating image generating methods according to various exemplary embodiments of the present general inventive concept.

DETAILED DESCRIPTION OF THE EMBODIMENTS

Figure 1:
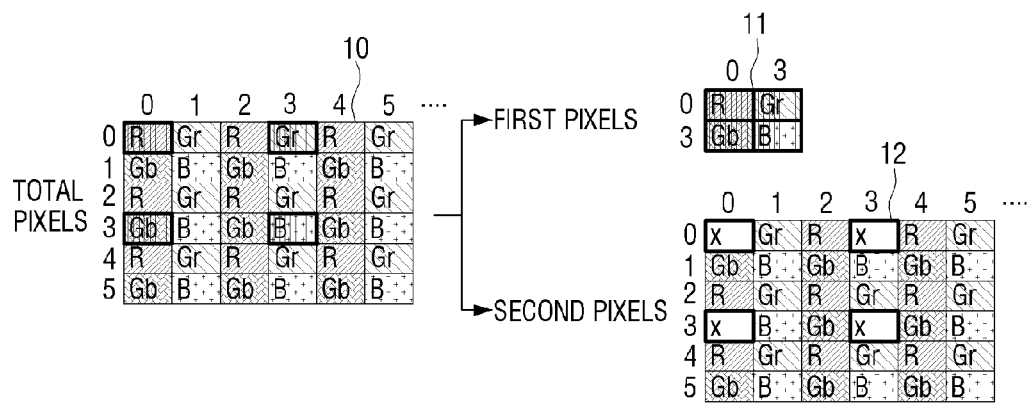
FIG. 1 is a schematic diagram illustrating technology to divide an image sensor for continuous shooting according to an exemplary embodiment of the present general inventive concept.

Reference will now be made in detail to the embodiments of the present general inventive concept, examples of which are illustrated in the accompanying drawings, wherein like reference numerals refer to the like elements throughout. The embodiments are described below in order to explain the present general inventive concept while referring to the figures.

The matters defined in the following description, such as detailed construction and elements, are provided to assist in a comprehensive understanding of the exemplary embodiments of the present general inventive concept. Thus, it is apparent that the exemplary embodiments can be carried out without those specifically defined matters. Also, functions or elements known in the related art are not described in detail since they would obscure the exemplary embodiments with unnecessary detail.

Figure 2:
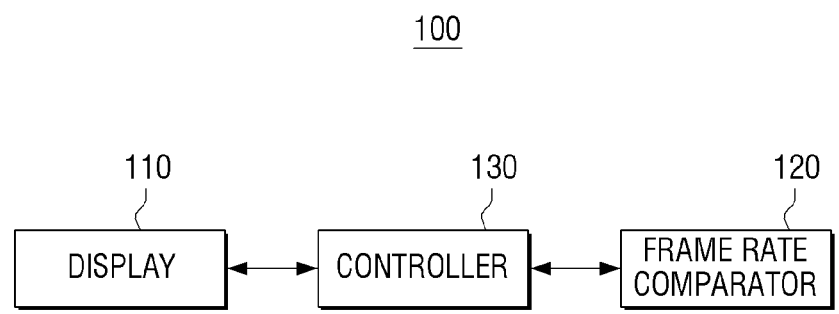
FIG. 2 is a block diagram illustrating a configuration of an image generating apparatus according to an exemplary embodiment of the present general inventive concept.

FIG. 2 is a block diagram illustrating a configuration of an image generating apparatus 100 according to an exemplary embodiment of the present general inventive concept.

Referring to FIG. 2, an image generating apparatus 100 according to an exemplary embodiment of the present general inventive concept includes a display 110, a frame rate comparator 120, and a controller 130.

The image generating apparatus 100 according to an exemplary embodiment of the present general inventive concept may be various electronic apparatuses including an image imaging function. For example, the image generating apparatus 100 may be implemented as any one among a digital camera, a smart phone, a cellular phone, an MPEG Audio Layer 3(MP3), a portable multimedia player (PMP), a tablet PC, a laptop computer, smart glasses, and a smart watch.

For the purposes of the present general inventive concept, "imaging" an image corresponds to capturing, photographing, generating, storing, and/or transmitting an image, for example with a camera.

The display 110 is configured to display a live view image or display an imaged still image. The display 110 may perform an electrical view finder function of the image generating apparatus 100.

When the image generating apparatus 100 enters an imaging mode, the display 110 images a subject, processes the imaged image in real time, and displays the imaged image as a live view image. As described above, the display 110 may generate the live view image using preset portions of pixels 10 of an image sensor. Even when there is a shutter operation, the display 110 continuously displays the live view image. The technology will be described in detail later.

The display 110 may be implemented with various techniques. For example, the display 110 may be implemented with various display techniques, such as an organic light emitting diode (OLED), a liquid crystal display (LCD), a plasma display panel (PDP), a vacuum fluorescent display (VFD), a field emission display (FED), or an electroluminescence display (ELD).

The display 110 may include a touch screen. At this time, the display 110 displays various user interfaces. When there is a touch input of a user for the displayed user interface, the display generates a control command corresponding to the touch input of the user to operate the image generating apparatus 100. A shutter configured to generate a still image may be provided as the displayed user interface, and at this time, the user may touch (press) the displayed shutter to input a shutter operation command to the image generating apparatus 100.

The image generating apparatus 100 includes the frame rate comparator 120. The frame rate comparator 120 is configured to compare shutter speed with a frame rate of the live view image when there is a shutter operation to image a still image during the displaying of the live view image.

The frame rate comparator 120 may be loaded into a memory in an operating system or an application form to perform the above described operation. Alternatively, the frame rate comparator 120 may be provided as a hardware chip (not illustrated), such as an embedded chip.

The controller 130 may control an overall operation of the image generating apparatus 100. Specifically, the controller 130 adds current frame data of a live view image to next frame data of the live view image when shutter speed is smaller than a frame rate of the live view image as a comparison result. The controller 130 may control to read out the next frame data of the live view image, to which the current frame data of the live view image is added, and to generate a still image.

The controller 130 controls an overall operation of an image generating apparatus. The controller 130 includes a hardware configuration such as a central processing unit (CPU) (not illustrated) or a cache memory, and a software configuration of an operating system or an application configured to perform a specific purpose. The controller 130 reads out a control command for each component configured to perform the operation described above or an operation to be described later according to a system clock (not illustrated) from a memory, and generates an electrical signal according to the read out control command to operate the hardware components. Further, the controller 130 may include a circuit configuration according to an exemplary embodiment of the present general inventive concept to be described later.

Hereinafter, the above-described exemplary embodiment of the present general inventive concept will be described in detail.

Figure 3:
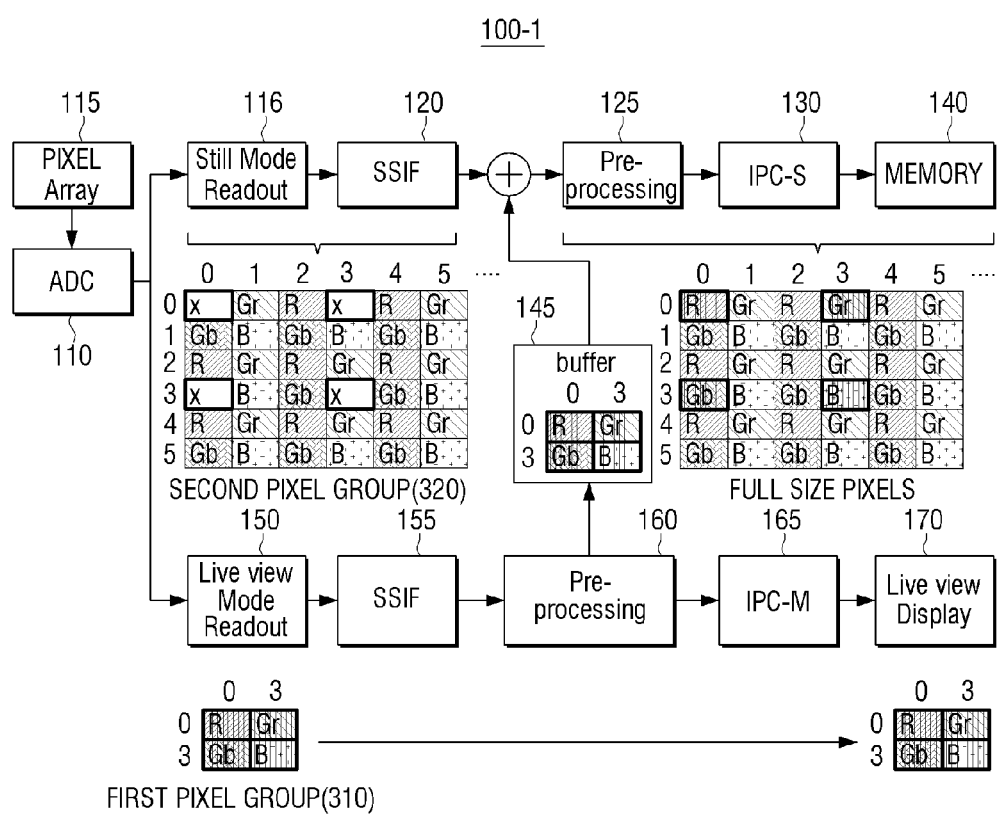
FIG. 3 is a schematic diagram illustrating a still image generating method of an image generating apparatus according to an exemplary embodiment of the present general inventive concept.

FIG. 3 is a schematic diagram illustrating a still image generating method of an image generating apparatus 100 according to an exemplary embodiment of the present general inventive concept.

An image capturing unit (not illustrated) of the image generating apparatus 100, 100-1 includes a shutter (not illustrated), a lens unit (not illustrated), an iris (not illustrated), and an image sensor such as a charge coupled device (CCD) image sensor or a complementary metal oxide semiconductor (CMOS) image sensor. The shutter and iris adjust an amount of light, and the CCD or CMOS image sensor accumulates the light through a photodiode PD of a pixel array 115, and output an electrical signal according to the amount of accumulated light. A color filter array (CFA) may be used to acquire a color image. The CFA passes through only light representing one color every one pixel and has a regular arrangement structure, and the CFA has various types according to the arrangement structure. The lens unit may include a zoom lens configured to magnify or reduce a size of a subject and a focus lens configured to adjust a focus of the object.

The output electrical signal is converted into a digital signal through an analog-digital converter (hereinafter referred to as ADC) 110. Processing for a still image and processing for a live view image are separately performed.

Figure 4:
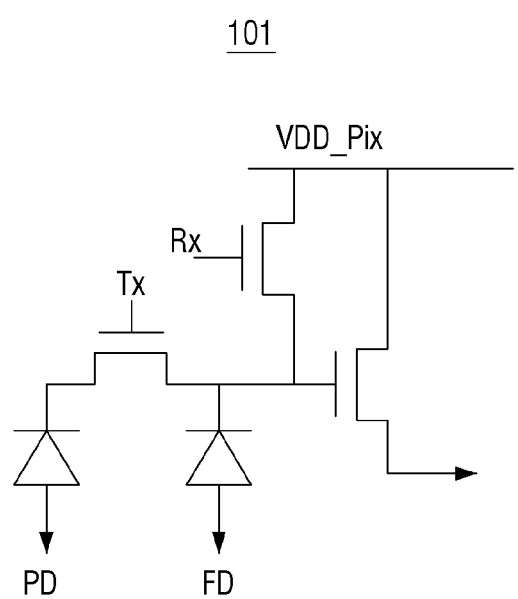
FIG. 4 is a view illustrating an image sensor circuit according to an exemplary embodiment of the present general inventive concept.
Figure 5A:
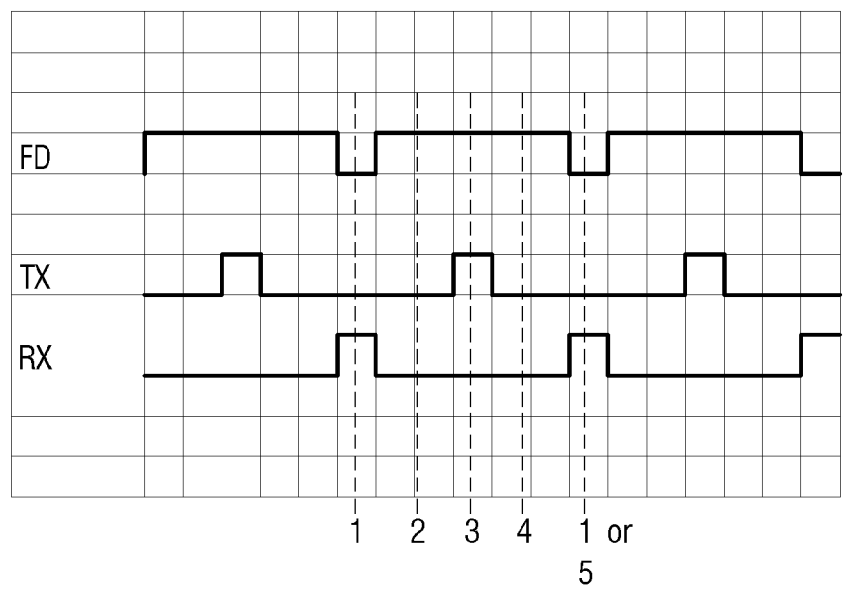
FIG. 5A is a timing diagram of a configuration of the image sensor circuit illustrated in FIG. 4.
Figure 5B:
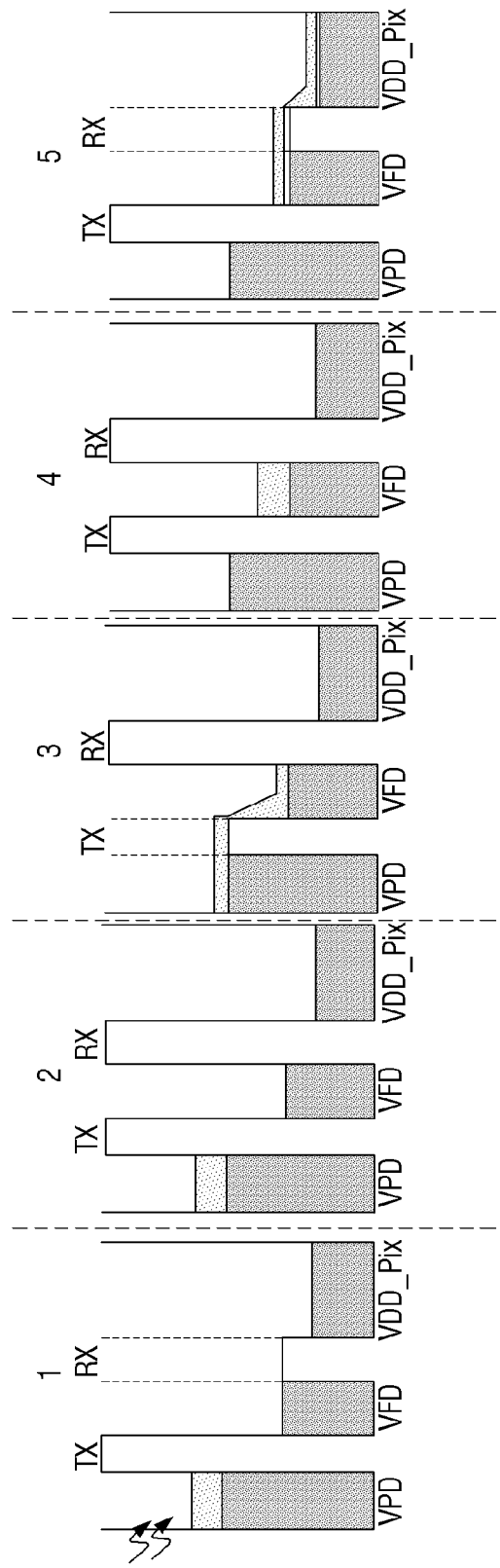
FIG. 5B is a potential diagram of a configuration of the image sensor circuit illustrated in FIG. 4.

FIG. 4 is a view illustrating an image sensor circuit 101 according to an exemplary embodiment of the present general inventive concept, FIG. 5A is a timing diagram of a configuration of the image sensor circuit 101 illustrated in FIG. 4, and FIG. 5B is a potential diagram of the configuration of the image sensor circuit 101 illustrated in FIG. 4.

The above-described process will be described in detail with reference to FIGS. 4 to 5B.

As illustrated in FIG. 4, the image sensor circuit 101 includes a photodiode PD, a transfer transistor TX, a reset transistor RX, and a floating diffusion node FD. The photodiode PD generates photo charges corresponding to an optical image of a subject and accumulates the generated photo charges. The transfer transistor TX transfers the photo charges generated in the photodiode PD to the floating diffusion node FD in response to a transfer signal. The reset transistor RX discharges the charges stored in the floating diffusion node FD in response to a reset signal. Before the reset signal is applied, the charges stored in the floating diffusion node FD are output, and in a correlated double sampling (CDS) image sensor, CDS processing is performed.

Referring to FIGS. 5A and 5B, an exposure for the photodiode PD is performed in a period in which the transfer of the transfer transistor TX is not performed. The photodiode PD generates photo charges corresponding to an optical image of a subject. When the reset transistor RX performs a reset operation in a first stage (1), as illustrated in FIG. 5B there is almost no potential barrier between the floating diffusion node FD and a power supply VDD_pix, and charges stored in the floating diffusion node FD are therefore discharged. However, since the transfer transistor TX does not allow charges to be transferred in the first stage, a potential barrier exists between the photodiode PD and the floating diffusion node FD in the first stage, and so no charges are transferred between the photodiode PD and the floating diffusion node FD.

In a second stage (2), the charge transfer as well as the reset operation is not performed, and charge accumulation of the photodiode PD is continuously performed. Unlike in the first stage, the reset operation is not performed, and so a potential barrier exists between the floating diffusion node FD and the power supply VDD_pix, blocking the transfer of charges therebetween.

A third stage (3) is a charge transfer stage. That is, the transfer transistor TX transfers the photo charges generated in the photodiode PD to the floating diffusion node FD in response to the transfer signal, and the floating diffusion node FD stores the charges.

In a fourth stage (4), the transfer transistor TX stops the transfer, and the charges stored in the floating diffusion node FD are output (read out). In a CDS image sensor, CDS processing is performed. The ADC 110 converts a CDS-processed analog signal into a digital signal. In a fifth stage (5) following the fourth stage, a reset operation is performed. In the exemplary embodiment of the present general inventive concept illustrated in FIGS. 5A-5B, the fifth stage is identical to the first stage, in that the reset operation is performed.

The charges accumulated through the first to fourth stages are read out to acquire raw data for image generation. In an exemplary embodiment of the present general inventive concept, the still image and the live view image are generated by reading out different image pixels. That is, live view image data is generated using read-out data (hereinafter, referred to as first data) for a first pixel group 310 among total image pixels 10, and a still image is generated by combining read-out data (second data) for a second pixel group 320 other than the first pixel group 310 and the read-out data (the first data) for the first pixel group 310. As a result, the still image is generated using pixel data of a full size.

At this time, a method of reading out one pixel among total pixels and skipping two pixels to generate a live view image may be defined as a 1R2S method. Similarly, data of the first pixel group 310 may be read out using a 2R2S method, a 1R4S method, or a 2R4S method.

With reference to FIG. 3, the first data and the second data are read out at 150 and 116, respectively corresponding to live view mode readout and still mode readout. The first and second data are then output through sensor interfaces (SSIFs) 155 and 120, respectively corresponding to the live view mode and the still mode. The image processors (not illustrated) performs image pre-processing on the respective output image data (pre-processing illustrated in FIG. 3 at 160, 125). For example, the image processors eliminate a black level due to a dark current generated in a CCD image sensor and a CFA filter sensitive to temperature change. The image processors may perform gamma correction for encoding information according to nonlinearity of a human vision system. The image processor may perform CFA interpolation to interpolate a Bayer pattern implemented in a RGRG line and a GBGB line of gamma-corrected predetermined data in a RGB line. The image processor converts the interpolated RGB signal into a YUV signal, performs an edge compensation to sharply process an image by filtering a Y signal by a high-pass filter and color correction to correct a U signal and a V signal using a standard color coordinate system, and removes noise of the YUV signal.

The first data is subject to IPC_M for moving image processing (165) to be output in a live view image. The second data is subject to IPC_S for still image processing (130) to be stored in a memory 140, for example an SD card. The first data stored in a buffer (145) is combined with the second data and the above-described image pre-processing 125 is performed when there is a still image generation command.

It is considered that a user operates a shutter to image a still image. When shutter speed is equal to or larger than a frame rate of a live view image, still image data may be generated by combining the first data for live view image generation and the second data read out simultaneously with the first data. In the exemplary embodiment of the present general inventive concept, it is assumed that an exposure starting time of the photodiode PD is synchronized between still image generation and live view image generation. The assumption may be applied to exemplary embodiments of the present general inventive concept to be described below.

For example, it is assumed that the frame rate of the live view image is 1/60 second, and the shutter speed is 1/60 second. When a continuous shooting command is input at a time t0, the controller 130 exposes the first pixel group 310 and the second pixel group 320 to light for 1/60 second from the time t0 to read out the first data of one frame and the second data of one frame, and signal-processes the read out first data and second data to generate a still image of one frame. At this time, there is no difference in the number of read-outs for still image generation as compared in live view image display.

However, when the shutter speed is less than the frame rate of the live view image, the number of read-outs is slightly different. The controller 130 has to generate still image data by adding the first data of a plurality of frames acquired in the same time as the exposure time of the second pixel group 320 to acquire the second data.

When the frame rate of the live view image is 1/60 second, and the shutter speed is 1/30 second, the controller 130 exposes the second pixel group 320 to light for 1/30 second from the time t0 to read out second data of one frame when a continuous shooting command is input at the time t0. The controller 130 has to combine data, in which first data of a frame acquired by exposing the first pixel group 310 to light from 1/60 second from the time t0 (hereinafter, referred to as first-first data), is added to the first data of a frame acquired by exposing the first pixel group 310 to light for the next 1/60 second (hereinafter, referred to as first-second data), is combined with the second data.

However, as described above, noise is generated in the process of reading out the charges stored in the floating diffusion node FD. When the shutter speed is smaller than the frame rate of the live view image, since the first data has to be read out twice as described above, an amount of noise is increased. Therefore, it is necessary to reduce the number of read-outs so as to remove the noise.

As described above, in the exemplary embodiment of the present general inventive concept, a method of reducing the number of read-outs is suggested. That is, when there is a shutter operation to image a still image during live view image display, the frame rate comparator 120 compares the shutter speed with the frame rate of the live view image. When it is determined that the shutter frame is smaller than the frame rate of the live view image, the controller 130 adds current frame data of the live view image to next frame data of the live view image, and generates a still image using the next frame data to which the current frame data of the live view image is added. Hereinafter, the still image generating operation will be described in detail.

Figure 6:
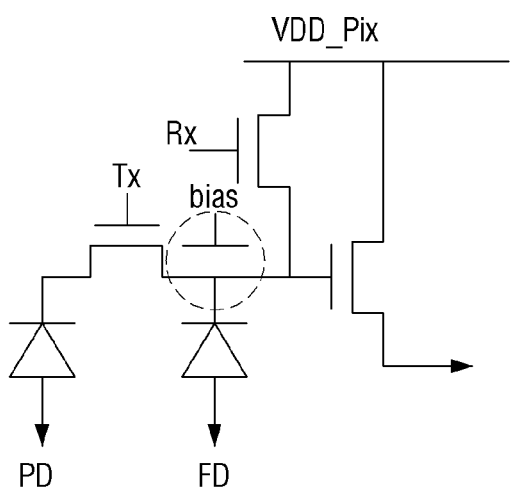
FIG. 6 is a view illustrating an image sensor circuit according to an exemplary embodiment of the present general inventive concept.
Figure 7A:
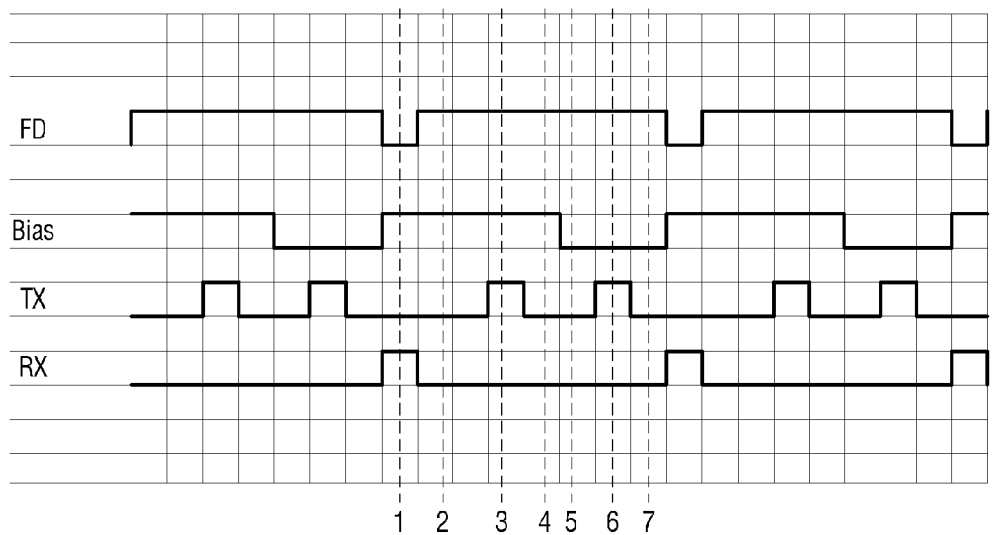
FIG. 7A is a timing diagram of a configuration of the image sensor circuit illustrated in FIG. 6.

FIG. 6 is a view illustrating an image sensor circuit 102 according to an exemplary embodiment of the present general inventive concept, FIG. 7A is a timing diagram of a configuration of the image sensor circuit 102 illustrated in FIG. 6, and FIG. 7A is a potential diagram of the configuration of the image sensor circuit 102 illustrated in FIG. 6.

As illustrated in FIG. 6, an image sensor circuit 102 according to an exemplary embodiment of the present general inventive concept basically has the similar configuration to the image sensor circuit 102 illustrated in FIG. 4. That is, the image sensor circuit 102 includes a photodiode PD, a transfer transistor TX, a reset transistor RX, and a floating diffusion node FD. However, the image sensor circuit 102 illustrated in FIG. 6 further includes a circuit configuration configured to form a reverse potential between the photodiode PD and the floating diffusion node FD. In an exemplary embodiment of the present general inventive concept, the circuit configuration may be a configuration configured to apply a bias voltage ("bias") as illustrated in FIG. 6. That is, the bias voltage is applied (or is not applied) from outside the image sensor circuit 102, and thus a potential barrier between the photodiode FD and the floating diffusion node (FD) may be eliminated even when the transfer transistor TX stops the transfer, and a reverse potential may be formed.

Figure 7B:
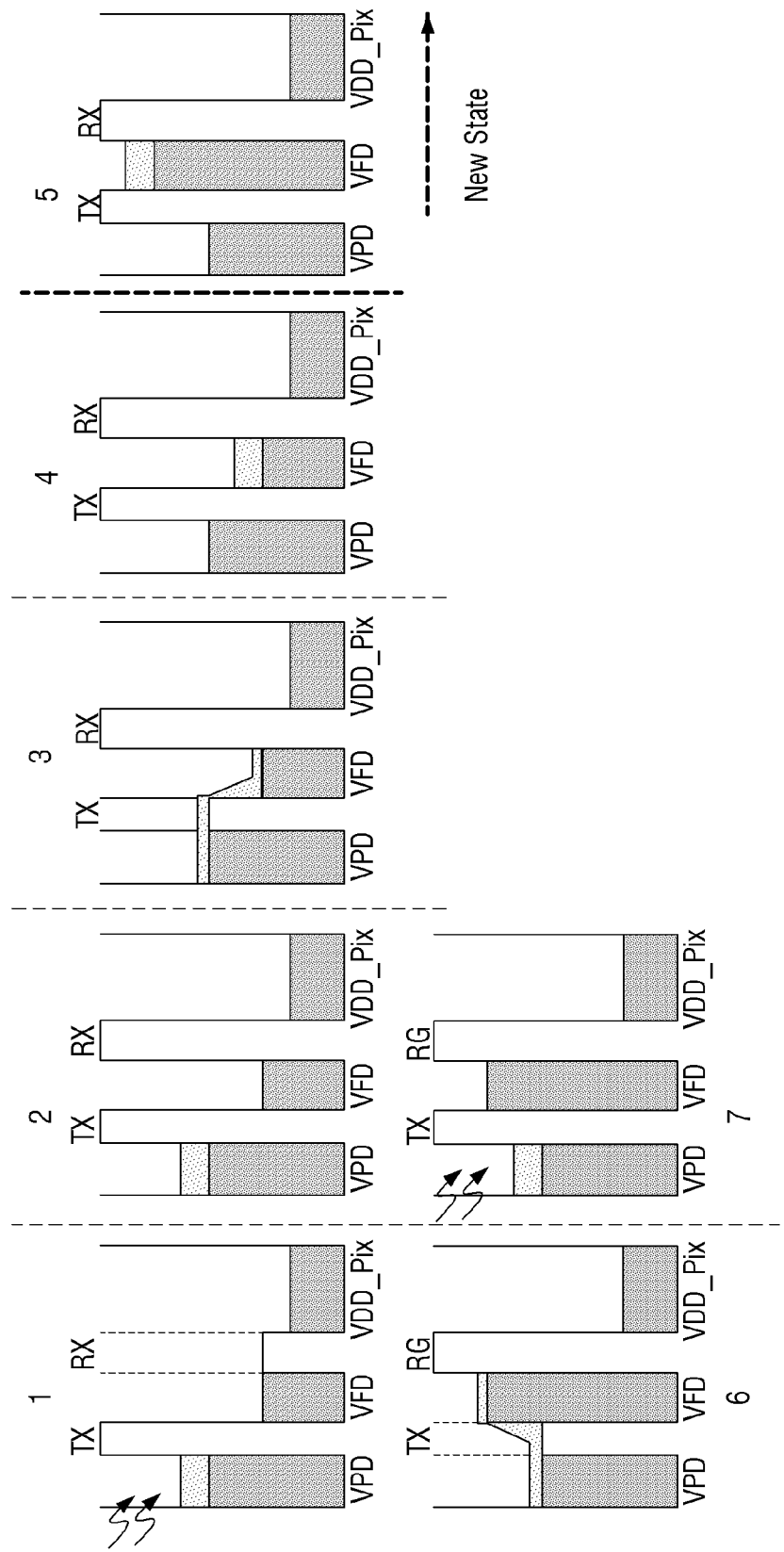
FIG. 7B is a potential diagram of a configuration of the image sensor circuit illustrated in FIG. 6.

Referring to FIGS. 7A and 7B, a circuit operation when the frame rate comparator 120 determines that shutter speed is smaller than a frame rate of a live view image will be described.

As illustrated in FIGS. 7A and 7B, an exposure for the photodiode PD is performed in a period in which the transfer of the transfer transistor TX is not performed. Stages to be described later are set based on the frame rate of the live view image. That is, the first to fourth stages are the same as a cycle in which the first data to generate one image frame constituting the live view image is read out. The photodiode PD generates photo charges corresponding to an optical image of a subject. When the reset transistor RX performs a reset operation in the first stage (1), as illustrated in FIG. 7B there is almost no potential barrier between the floating diffusion node FD and a power supply VDD_pix, and charges stored in the floating diffusion node FD are therefore discharged. However, since the transfer transistor TX does not allow charges to be transferred in the first stage, a potential barrier exists between the photodiode PD and the floating diffusion node FD in the first stage, and so no charges are transferred between the photodiode PD and the floating diffusion node FD. It can be seen in FIGS. 7A and 7B that in the first stage, a bias voltage is applied, but the potential barrier exists as it is. That is, in the exemplary embodiment of the present general inventive concept illustrated in FIGS. 7A and 7B, since the potential barrier is maintained when the bias voltage is applied, and the potential barrier is collapsed when the bias voltage is interrupted, the bias is determined as a reverse bias.

In the second stage (2), the charge transfer as well as the reset operation is not performed, and charge accumulation of the photodiode PD is continuously performed. Unlike in the first stage, since the reset operation is not performed, a potential barrier exists between the floating diffusion node FD and the power supply VDD_pix, blocking the transfer of charges therebetween.

A third stage (3) is a charge transfer stage. That is, the transfer transistor TX transfers the photo charges generated in the photodiode PD to the floating diffusion node FD in response to a transfer signal, and the floating diffusion node FD stores the charges.

In a fourth stage (4), the transfer transistor TX stops the transfer, and the charges stored in the floating diffusion node FD are output (read-out of the first-first data). The output charges are used to generate a live view image. However, when there is a still image generation input, the first-first data is not used to generate the still image at this point. A process after a fifth stage (5) is performed to read out data for still image generation. Further, the reset transistor RX does not reset the charges stored in the floating diffusion node FD.

In the fifth stage, the potential barrier between the photodiode PD and the floating diffusion node FD is collapsed due to a bias voltage (the bias voltage may be a forward bias or a reverse bias). However, in a sixth stage (6), only after the transfer transistor TX forms a charge transfer path, charges are transferred. The photodiode PD adds photo charges transferred from the floating diffusion node FD to photo charges accumulated in the photodiode PD in a seventh stage (7).

Before a second data read-out for still image generation after the seventh stage, the transfer transistor TX transfers the added charges to the floating diffusion node FD similarly to the third stage described above, and upon the arrival of the timing of the second data read-out, a read-out operation is performed to generate a still image. In this manner, the first-first data is combined with the first-second data in the photodiode PD, so that only one read-out is required to obtain the combined data. In the fifth to seventh stages, times required to perform the stages may be determined according to a relative speed difference between the shutter speed and the frame rate of the live view image. Finally, only one read-out operation is performed on the first-first data and the first-second data to coincide with the shutter speed for still image generation.

When the still image is generated according to the above-described method, since it is not necessary to read out the first data for live view image generation plural times when the shutter speed is slow, noise is reduced.

Even in the above-described case, the first data for live view image generation has to be read out plural times. For example, when shutter speed is 1/30 second, and a frame rate of a live view image is 1/60 second, the first-first data for live view image generation is read out in the fourth stage, and the first-second data for live view image generation is read out again after the seventh stage. The first-second data becomes next frame data of the live view image. However, since the first-second data is data to which first data of an image frame of a previous stage is added, the subject is blurred, and thus the live view image is blurred when it is displayed.

Figure 9:
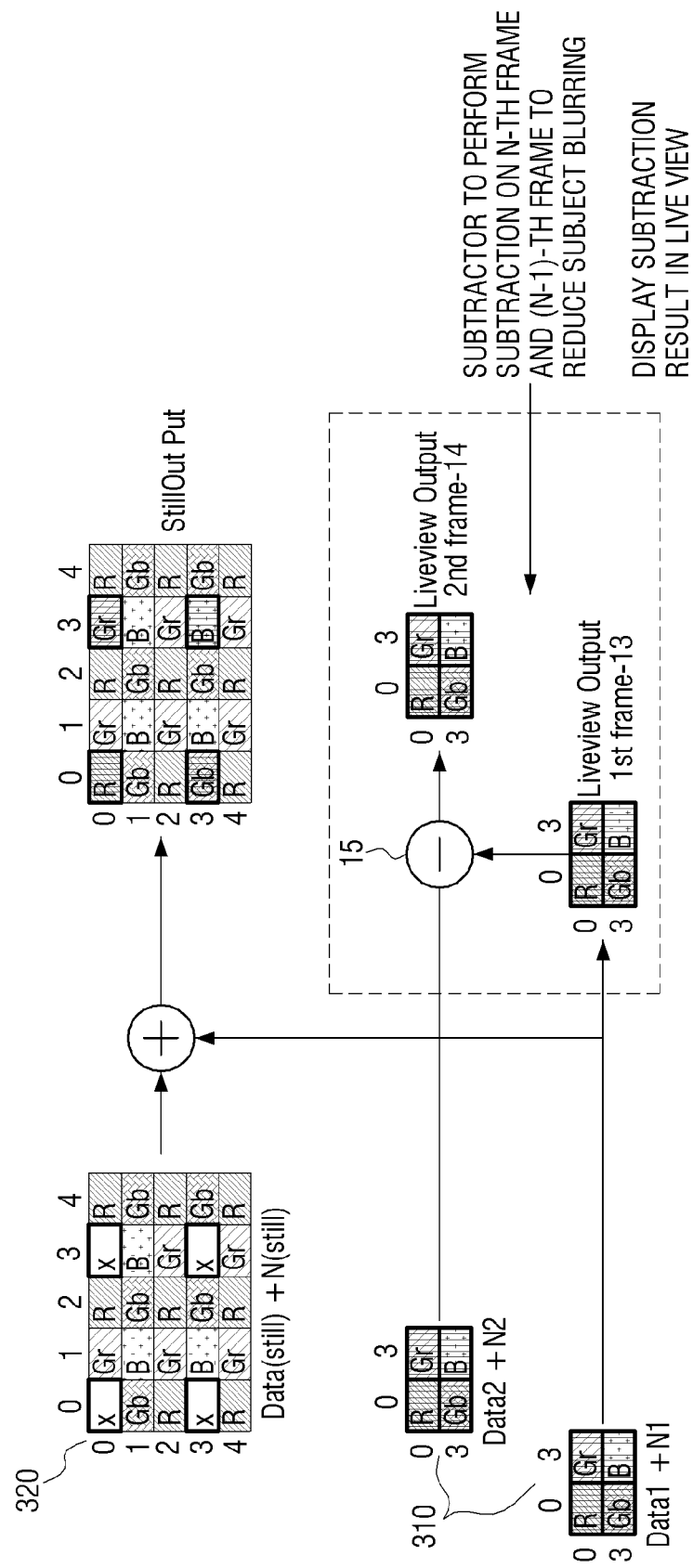

To solve the problem, the image sensor circuit 102 may further include a subtractor 15 (illustrated in FIG. 9). As described above, the first-first data of the live view image is added to the first-second data of the live view image. The subtractor 15 may subtract the first-first data of the live view image from the first-second data of the live view image. The first-second data, from which the first-first data is subtracted, is then read to generate a live view image with reduced blurring.

Figure 8:
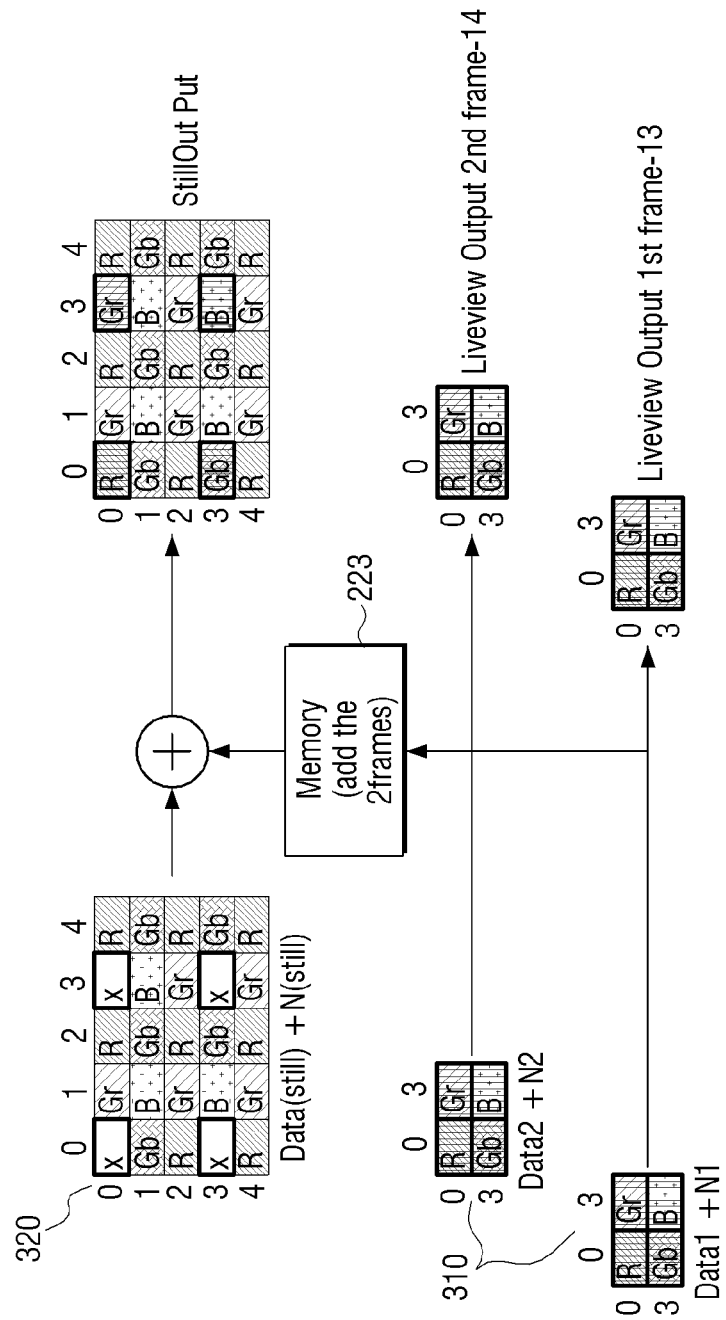
FIGS. 8 and 9 are conceptual diagrams illustrating an operation of the image generating apparatus according to an exemplary embodiment of the present general inventive concept.

FIGS. 8 and 9 are conceptual diagrams illustrating an operation of an image generating apparatus according to an exemplary embodiment of the present general inventive concept.

As described above, it is assumed that shutter speed is 1/30 second, and a frame rate of a live view image is 1/60 seconds.

An exemplary embodiment of the present general inventive concept illustrated in FIG. 8 conceptually illustrates the exemplary embodiment of the present general inventive concept illustrated in FIGS. 4 to 5B. A process of the first to fourth stages illustrated in FIGS. 5A to 5B is performed twice to generate a first frame 13 and a second frame 14 of the live view image. Photo charge data is read out from a first pixel group 310 of total image pixels 10 to generate each frame of the live view image. When the photo charge data is read out from the first pixel group 310 of total image pixels 10, a load for the live view image processing is reduced, and thus it is easy to process a still image independently. In the still image, photo charge data is read out from a second pixel group 320 corresponding to the remaining pixels of the total image pixels 10, and combined with the photo charge data for the live view image generation to generate the whole image. As described above, since the frame rate of the live view image is twice the shutter speed, the data for the first pixel group 310, which is read out to generate each frame of the live view image, is output twice and added together in memory 223.

An exemplary embodiment of the present general inventive concept illustrated in FIG. 9 conceptually illustrates the exemplary embodiment of the present general inventive concept illustrated in FIGS. 6 to 7B. In the exemplary embodiment of the present general inventive concept, a process of the first to fourth stages illustrated in FIGS. 7A to 7B is performed to generate a first frame 13 of the live view image, and a process of the fifth to seventh stages illustrated in FIGS. 7A and 7B is performed to generate a second frame 14 of the live view image. Similarly, photo charge data is read out from a first pixel group 310 of total image pixels 10 to generate each frame of the live view image. In the still image, photo charge data is read out from a second pixel group 320 corresponding to the remaining pixels of the total image pixels 10, and combined with the photo charge data from the first pixel group 310 for the live view image generation to generate the whole image. In this exemplary embodiment of the present general inventive concept, the first-first data and the first-second data are combined in the photodiode PD, and so the data from the first pixel group 310 does not need to be separately combined in a memory 223 before being combined with the photo charge data from the second pixel group 320. Unlike the exemplary embodiment of the present general inventive concept described above with reference to FIG. 8, even after the first to fourth stages are performed, the photo charge data of the floating diffusion node FD is not reset to collapse a potential barrier, and the stored photo charges are added to the photo charges of the photodiode PD. The photo charge data of the live view image for still image generation is read out once after the seventh stage is performed. With respect to the live view image, photo charge data in which the photo charge data stored to generate the first frame 13 from the photo charge data stored after the seventh stage is completed is used. Specifically, subtractor 15 subtracts the first-first data, corresponding to first frame 13, from the first-second data, corresponding to second frame 14, to generate the live view output with reduced blurring.

Although not illustrated in the drawings, the image generating apparatus 100 includes an essential configuration provided in the general electronic computing apparatus. That is, the image generating apparatus includes a hardware configuration, such as a central processing unit (CPU) having a sufficient control and logic function, a cache memory, a random access memory (RAM), a high-capacity auxiliary storage device such as a hard disc or a Blu-Ray (BD) disc, a near field communication (NFC) module, various wired and wireless communication modules including a high-definition multimedia interface (HDMI), and a data bus, and the image generating apparatus 100 includes an application, a framework, and an operating system which are configured to perform the function of the controller 130.

Specifically, a storage unit (not illustrated) is configured to store a captured image. That is, the storage unit stores an image frame constituting the live view image or stores a still image. The storage unit may convert the captured image into an efficient form and store the converted result. The storage unit may be implemented with various techniques, and for example, the storage unit may include a memory, a hard disc drive (HDD), a Blu-Ray disc (BD), and the like. In particular, a nonvolatile memory such as an electrically erasable and programmable read only memory (EEPROM) may be used to store a captured image for processing of the captured image.

Hereinafter, an image generating method according to various exemplary embodiments of the present general inventive concept will be described.

FIGS. 10 to 13 are flowcharts illustrating image generating method according to various exemplary embodiments of the present general inventive concept.

Figure 10:
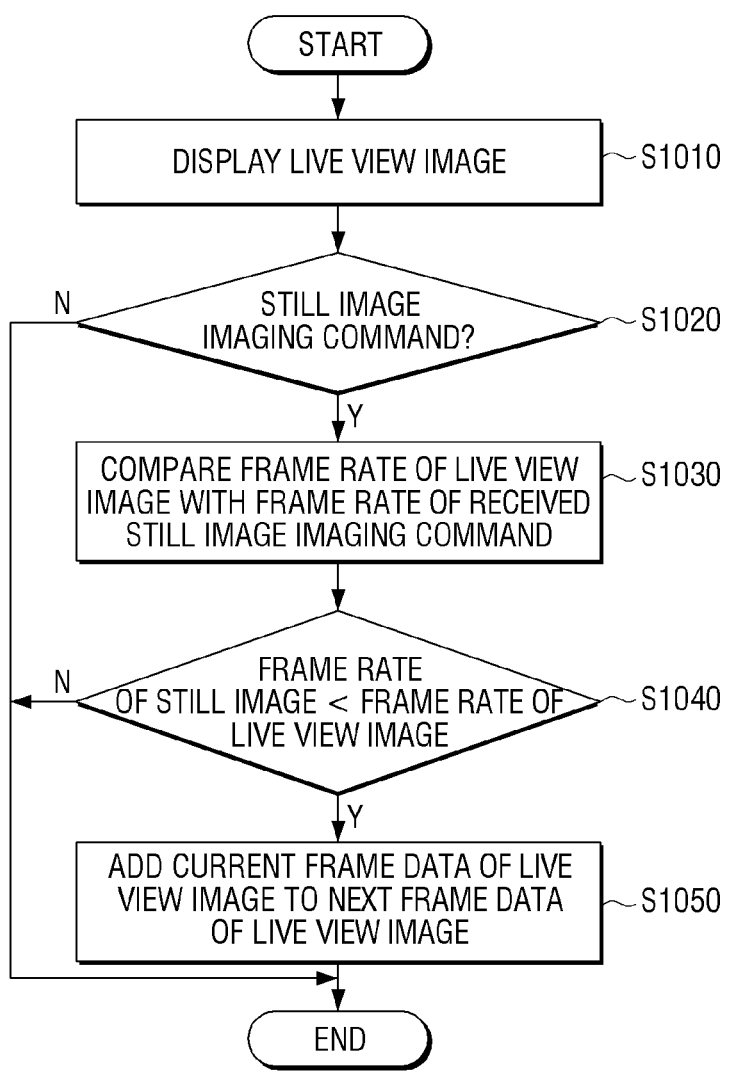

Referring to FIG. 10, an image generating method according to an exemplary embodiment of the present general inventive concept includes displaying a live view image on a screen of an image generating apparatus (operation S1010), determining if there is a shutter operation to image a still image (operation S1020), and comparing shutter speed (the frame rate of the received still image) with a frame rate of the live view image (operation S1030) when there is a shutter operation to image a still image during the display of the live view image (operation S1020-Y). When there is not a shutter operation to image a still image (operation S1020-N), the method ends.

Further, the method includes comparing the shutter speed with the frame rate of the live view image (operation S1040) and adding current frame data of the live view image to next frame data of the live view image (operation S1050) when the shutter speed is smaller than the frame rate of the live view image (operation S1040-Y). When the shutter speed is not less than the frame rate of the live view image (operation S1040-N), the method ends.

Figure 11:
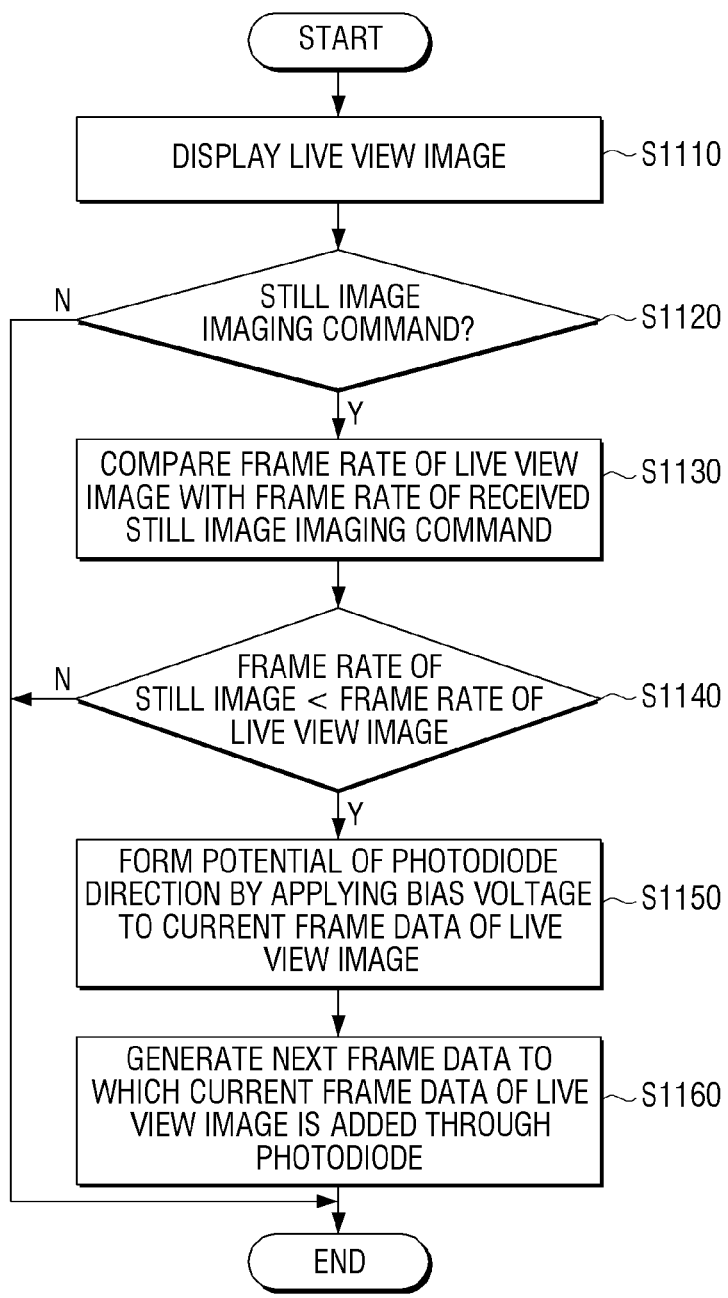

Referring to FIG. 11, an image generating method according to an exemplary embodiment of the present general inventive concept includes displaying a live view image on a screen of an image generating apparatus (operation S1110), determining if there is a shutter operation to image a still image (operation S1120), and comparing shutter speed with a frame rate of the live view image (operation S1130) when there is a shutter operation to image a still image during the display of the live view image (operation S1120-Y). When there is not a shutter operation to image a still image (operation S1120-N), the method ends.

Further, the method includes comparing the shutter speed with the frame rate of the live view image (operation S1140) and forming a potential of a direction of a photodiode by applying a bias voltage to current frame data of the live view image (operation S1150) when the shutter speed is smaller than the frame rate of the live view image as a comparison result (operation S1140-Y), and generating next frame data to which the current frame data of the live view image is added through the photodiode (operation S1160). When the shutter speed is not less than the frame rate of the live view image (operation S1140-N), the method ends.

Figure 12:
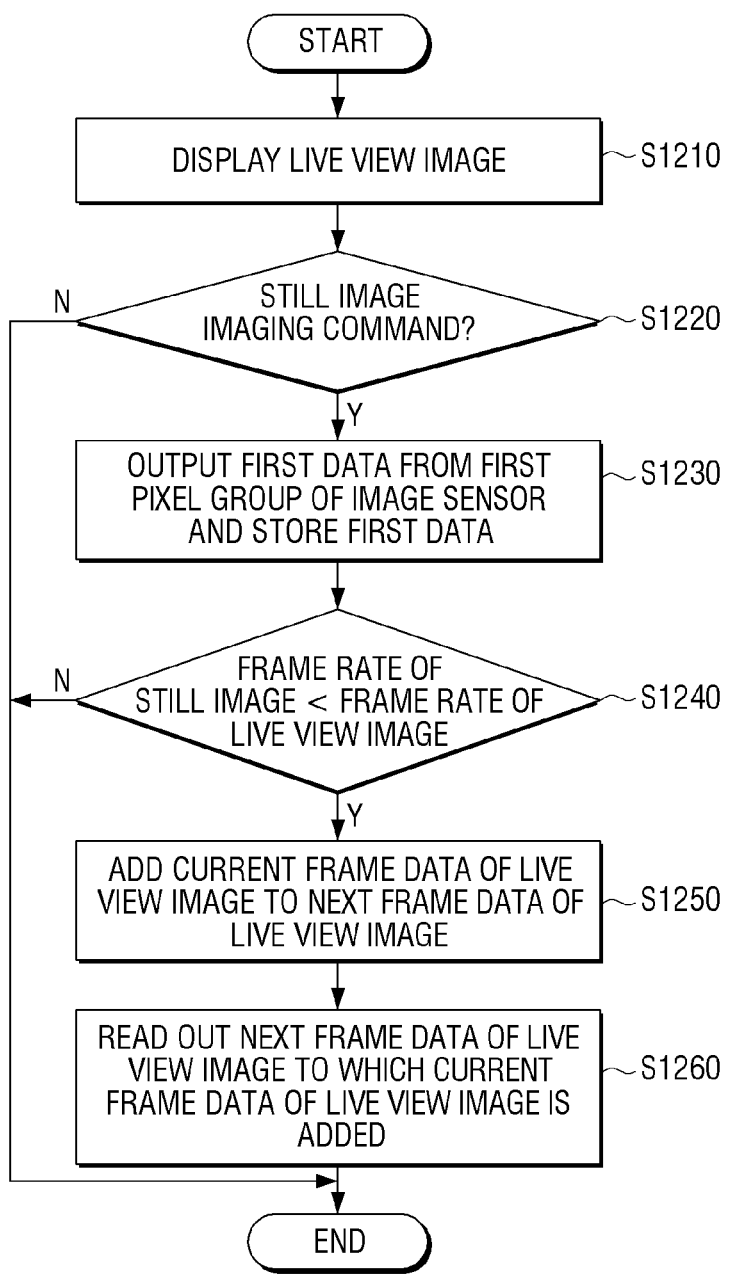

Referring to FIG. 12, an image generating method according to an exemplary embodiment of the present general inventive concept includes displaying a live view image on a screen of an image generating apparatus (operation S1210), determining if there is a shutter operation to image a still image (operation S1220), and outputting first data from a first pixel group of an image sensor and storing the first data (operation S1230) when there is a shutter operation to image a still image during the display of the live view image (operation S1220-Y). When there is not a shutter operation to image a still image (operation S1220-N), the method ends.

Further, the method includes comparing shutter speed with a frame rate of the live view image (operation S1240) and adding current frame data of the live view image to next frame data of the live view image (operation S1250) when the shutter speed is smaller than the frame rate of the live view image as a comparison result (operation S1240-Y). Further, the method includes reading out next frame data of the live view image to which the current frame data of the live view image is added (operation S1260). When the shutter speed is not less than the frame rate of the live view image (operation S1240-N), the method ends.

Referring to FIG. 13, an image generating method according to an exemplary embodiment of the present general inventive concept includes displaying a live view image on a screen of an image generating apparatus (operation S1310), determining if there is a shutter operation to image a still image (operation S1320), and comparing shutter speed with a frame rate of the live view image (operation S1330) when there is a shutter operation to image a still image during the display of the live view image (operation S1320-Y).

Further, the method includes comparing shutter speed with a frame rate of the live view image (operation S1330) and adding current frame data of the live view image to next frame data of the live view image (operation S1340) when the shutter speed is smaller than the frame rate of the live view image as a comparison result (operation S1330-Y). Further, the method includes generating a next frame image of the live view image by subtracting the current frame data of the live view image from the next frame data of the live view image to which the current frame data of the live view image is added (operation S1350). When the shutter speed is not less than the frame rate of the live view image (operation S1330-N), the method ends.

According to the above-described various exemplary embodiments, an image generating apparatuses and method, capable of minimizing noise generated when a read-out process for exposure data of an image sensor is performed plural times to generate a still image in a state in which shutter speed is different from a frame rate of a live view image, are provided.

The present general inventive concept can also be embodied as computer-readable codes on a computer-readable medium. The computer-readable medium can include a computer-readable recording medium and a computer-readable transmission medium. The computer-readable recording medium is any data storage device that can store data as a program which can be thereafter read by a computer system. Examples of the computer-readable recording medium include a semiconductor memory, a read-only memory (ROM), a random-access memory (RAM), a USB memory, a memory card, a Blu-Ray disc, CD-ROMs, magnetic tapes, floppy disks, and optical data storage devices. The computer-readable recording medium can also be distributed over network coupled computer systems so that the computer-readable code is stored and executed in a distributed fashion. The computer-readable transmission medium can transmit carrier waves or signals (e.g., wired or wireless data transmission through the Internet). Also, functional programs, codes, and code segments to accomplish the present general inventive concept can be easily construed by programmers skilled in the art to which the present general inventive concept pertains.

The image generating method may also be embedded in a hardware integrated circuit (IC) chip in an embedded software form or provided in firmware.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. An image generating method, the method comprising:
    displaying a live view image on a screen of an image generating apparatus;
    comparing a shutter speed with a frame rate of the live view image when there is a command to photograph a still image during the displaying of the live view image;
    adding current frame data of the live view image to next frame data of the live view image to generate added next frame data when the shutter speed is smaller than the frame rate of the live view image; and
    reading out the added next frame data of the live view image to generate the still image,
    wherein the adding of the current frame data of the live view image to the next frame data of the live view image includes adding the current frame data of the live view image to the next frame data of the live view image without resetting the current frame data of the live view image.

2. The method of claim 1, wherein the adding of the current frame data of the live view image to the next frame data of the live view image comprises:
    forming a potential of a direction of a photodiode by applying a bias voltage to the current frame data of the live view image; and
    generating the next frame data to which the current frame data of the live view image is added through the photodiode.

3. The method of claim 1, further comprising:
    when the command to photograph the still image is received during the displaying of the live view image, outputting first data from a first pixel group of an image sensor; and
    storing the first data,
    wherein the frame data of the live view image is based on data output from a second pixel group of the image sensor distinct from the first pixel group.

4. The method of claim 3, wherein the generating of the still image includes generating a final still image by combining the stored first data and the read out added next frame data of the live view image.

5. The method of claim 1, further comprising subtracting the current frame data of the live view image from the next frame data of the live view image, to which the current frame data of the live view image is added, to generate a next image frame of the live view image when the shutter speed is smaller than the frame rate of the live view image.

6. The method of claim 5, further comprising displaying the generated next image frame of the live view image.

7. The method of claim 1, further comprising generating the still image based on the current frame data of the live view image when the shutter speed is equal to or larger than the frame rate of the live view image.

8. A non-transitory computer-readable recording medium to contain computer-readable codes as a program to execute the method of claim 1.

9. An image generating apparatus comprising:
a display configured to display a live view image;
a frame rate comparator configured to compare a shutter speed with a frame rate of the live view image when there is a command to photograph a still image during displaying of the live view image; and
a controller configured to add current frame data of the live view image to next frame data of the live view image when the shutter speed is smaller than the frame rate of the live view image, and to read out the next frame data of the live view image, to which the current frame data of the live view image is added, to generate the still image,
wherein the controller adds the current frame data of the live view image to the next frame data of the live view image without resetting the current frame data of the live view image.

10. The image generating apparatus of claim 9, wherein the controller forms a potential of a direction of a photodiode by applying a bias voltage to the current frame data of the live view image, and generates the next frame data to which the current frame data of the live view image is added through the photodiode.

11. The image generating apparatus of claim 9, wherein the controller outputs first data from a first pixel group of an image sensor and stores the first data when the command to photograph the still image is received during the displaying of the live view image, and the frame data of the live view image is based on data output from a second pixel group of the image sensor distinct from the first pixel group.

12. The image generating apparatus of claim 11, wherein the controller generates a final still image by combining the stored first data and the read out next frame data of the live view image.

13. The image generating apparatus of claim 9, wherein the controller subtracts the current frame data of the live view image from the next frame data of the live view image, to which the current frame data of the live view image is added, to generate a next image frame of the live view image when the shutter speed is smaller than the frame rate of the live view image.

14. The image generating apparatus of claim 13, wherein the controller controls the generated next image frame of the live view image to be displayed.

15. The image generating apparatus of claim 9, wherein the controller generates the still image based on the current frame data of the live view image when the shutter speed is equal to or larger than the frame rate of the live view image.

16. The image generating apparatus of claim 9, wherein the image generating apparatus is at least one among a smart phone, a cellular phone, a digital camera, an MPEG Audio Layer 3 (MP3), a portable multimedia player (PMP), a tablet personal computer (PC), a laptop computer, smart glasses, and a smart watch.

17. An image generating method, the method comprising:
displaying a live view image;
receiving an input to perform a shutter operation to photograph a still image during the displaying of the live view image;
obtaining current frame data of the live view image at an image sensor;
if a shutter speed is smaller than a frame rate of the live view image, obtaining next frame data of the live view image at the image sensor, the next frame data being combined with the current frame data in the image sensor to generate added next frame data in the image sensor; and
reading out the added next frame data of the live view image from the image sensor to generate a still image,
wherein the obtaining next frame data of the live view image includes adding the current frame data of the live view image to the next frame data of the live view image without resetting the current frame data of the live view image.

18. An image generating apparatus comprising:
a display configured to display a live view image;
an image sensor to obtain frame data of the live view image; and
a controller configured to receive an input to perform a shutter operation to photograph a still image during displaying of the live view image, to control the image sensor to add current frame data of the live view image to next frame data of the live view image to generate added next frame data of the live view image in the image sensor when the shutter speed is smaller than the frame rate of the live view image, and to read out the added next frame data of the live view image to generate a still image,
wherein the controller adds the current frame data of the live view image to the next frame data of the live view image without resetting the current frame data of the live view image.

* * * * *